(12) United States Patent
Hubbell et al.

(10) Patent No.: US 6,705,744 B2
(45) Date of Patent: Mar. 16, 2004

(54) AREA LIGHTING DEVICE USING DISCRETE LIGHT SOURCES, SUCH AS LEDS

(76) Inventors: David A. Hubbell, 112 Park Ave., Saranac Lake, NY (US) 12983; Philip V. Desantis, 5449 Bayberry Dr., Seven Hills, OH (US) 44131

( * ) Notice: Subject to any disclaimer, the term of this patent is extended or adjusted under 35 U.S.C. 154(b) by 49 days.

(21) Appl. No.: 10/173,856

(22) Filed: Jun. 19, 2002

(65) Prior Publication Data

US 2002/0163805 A1 Nov. 7, 2002

Related U.S. Application Data

(62) Division of application No. 09/678,659, filed on Oct. 4, 2000.
(60) Provisional application No. 60/157,130, filed on Oct. 4, 1999.

(51) Int. Cl.[7] .............................................. F21V 21/14
(52) U.S. Cl. ..................... 362/250; 362/233; 362/249
(58) Field of Search ................................ 362/250, 233, 362/249

(56) References Cited

U.S. PATENT DOCUMENTS

| | | | | |
|---|---|---|---|---|
| 3,218,446 A | | 11/1965 | Langer | |
| 4,141,056 A | * | 2/1979 | Neely | 362/1 |
| 4,167,783 A | * | 9/1979 | Mitchell | 362/236 |
| 4,382,272 A | | 5/1983 | Quella et al. | |
| 4,434,454 A | * | 2/1984 | Day | 362/238 |
| 4,482,580 A | | 11/1984 | Emmett et al. | |
| 4,712,167 A | * | 12/1987 | Gordin et al. | 362/233 |
| 4,884,178 A | | 11/1989 | Roberts | |
| 5,255,171 A | | 10/1993 | Clark | |
| 5,297,012 A | | 3/1994 | Fletcher | |
| 5,325,276 A | | 6/1994 | Sullivan | |
| 5,349,504 A | | 9/1994 | Simms et al. | |
| 5,365,411 A | | 11/1994 | Rycroft et al. | |
| 5,442,870 A | | 8/1995 | Kochanowski | |
| 5,647,661 A | * | 7/1997 | Gordin | 362/283 |
| 5,769,532 A | | 6/1998 | Sasaki | |
| 5,782,552 A | | 7/1998 | Green et al. | |
| 5,782,553 A | | 7/1998 | McDermott | |
| 5,813,753 A | | 9/1998 | Vriens et al. | |
| 5,857,767 A | | 1/1999 | Hochstein | |
| 5,876,107 A | | 3/1999 | Parker et al. | |
| 6,016,389 A | * | 1/2000 | Crookham et al. | 395/500.01 |

* cited by examiner

Primary Examiner—Sandra O'Shea
Assistant Examiner—Jacob Y. Choi
(74) Attorney, Agent, or Firm—Shlesinger, Arkwright & Garvey LLP

(57) ABSTRACT

An area lighting device comprises a plurality of panels arranged into a hollow box having interconnected side walls and open bottom; and at least one of the side wall panels comprising a light emitting panel having a lighted side facing inside the hollow box.

3 Claims, 13 Drawing Sheets

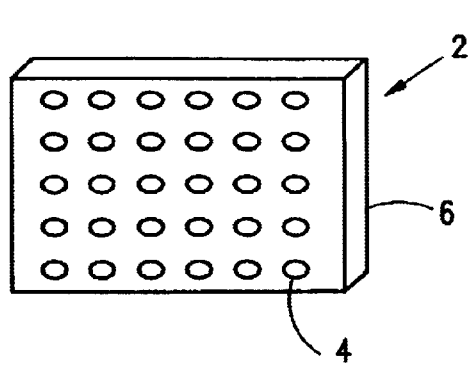
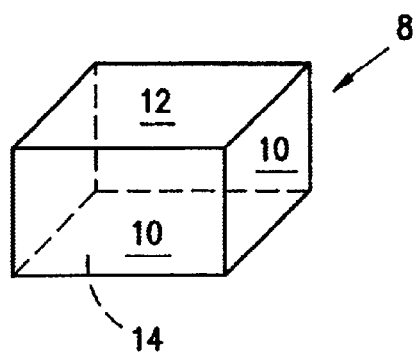
FIG. 1    FIG. 2
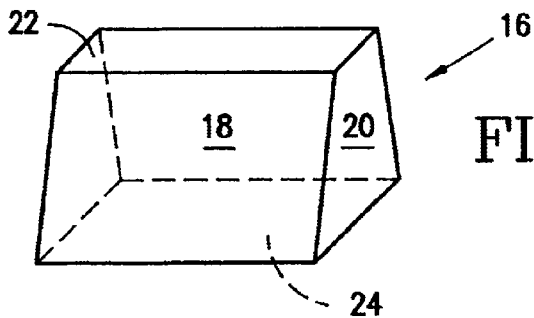
FIG. 3
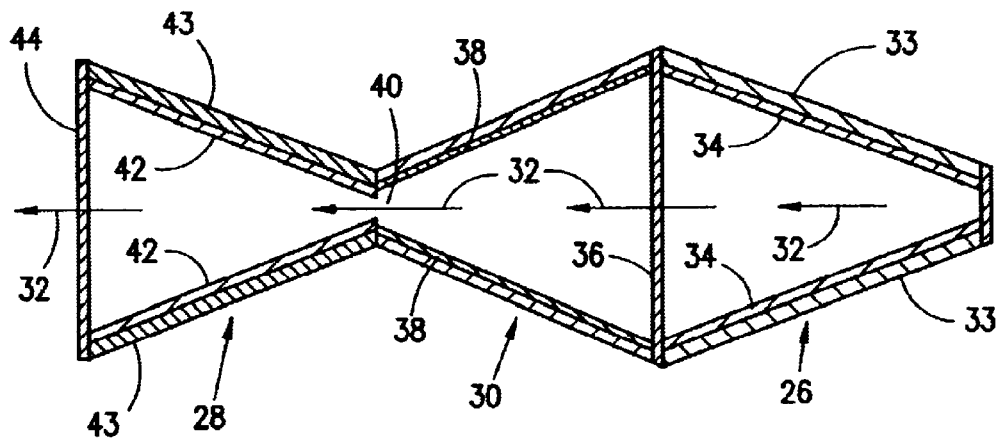
FIG. 4
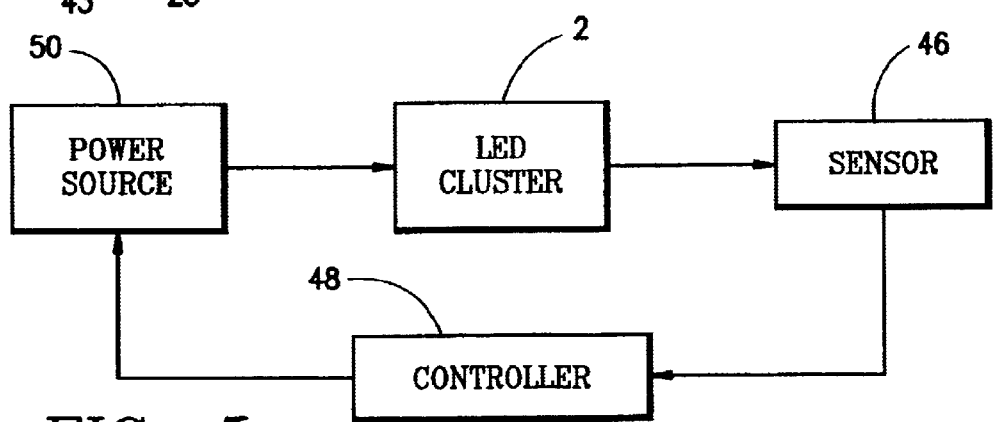
FIG. 5

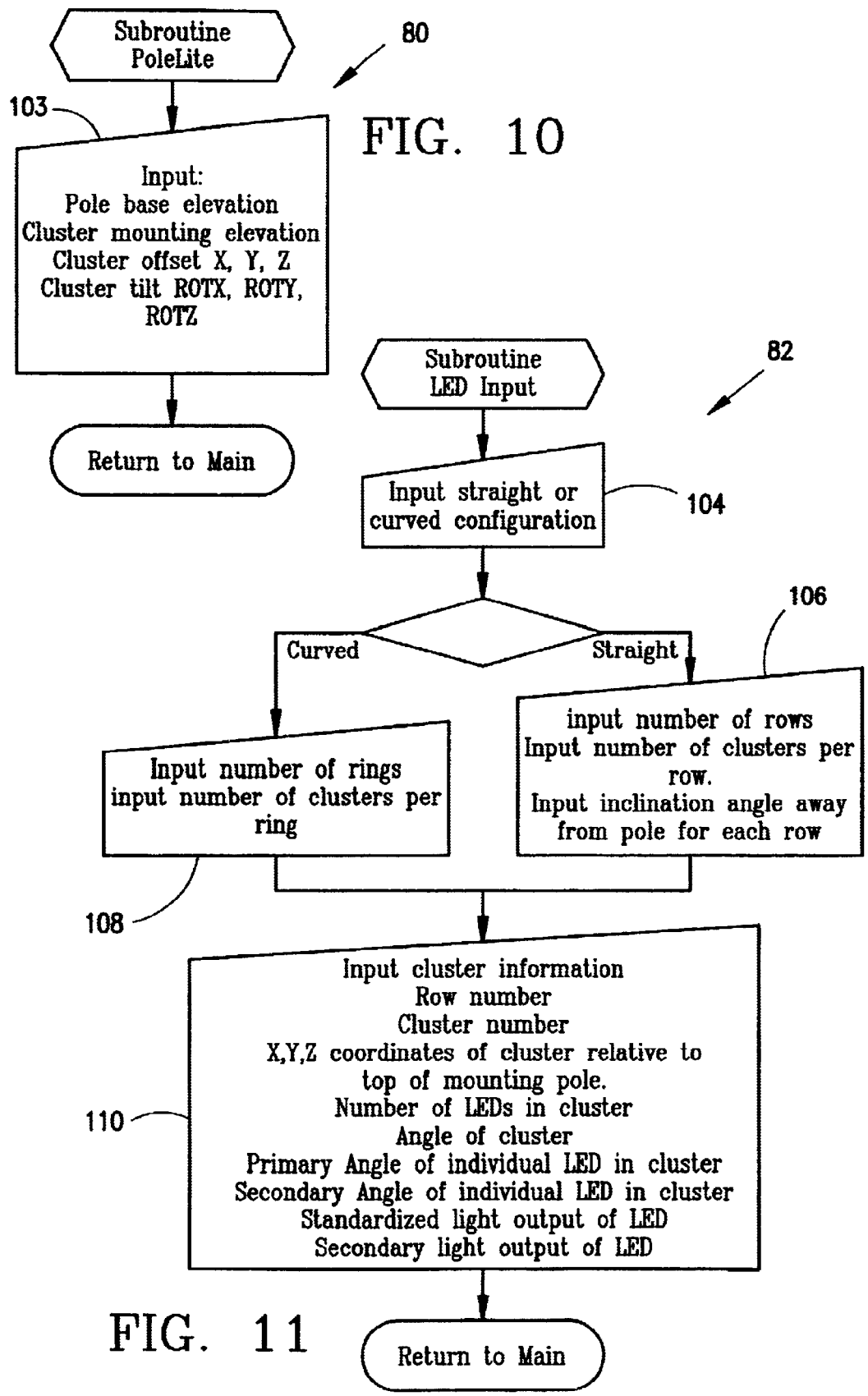

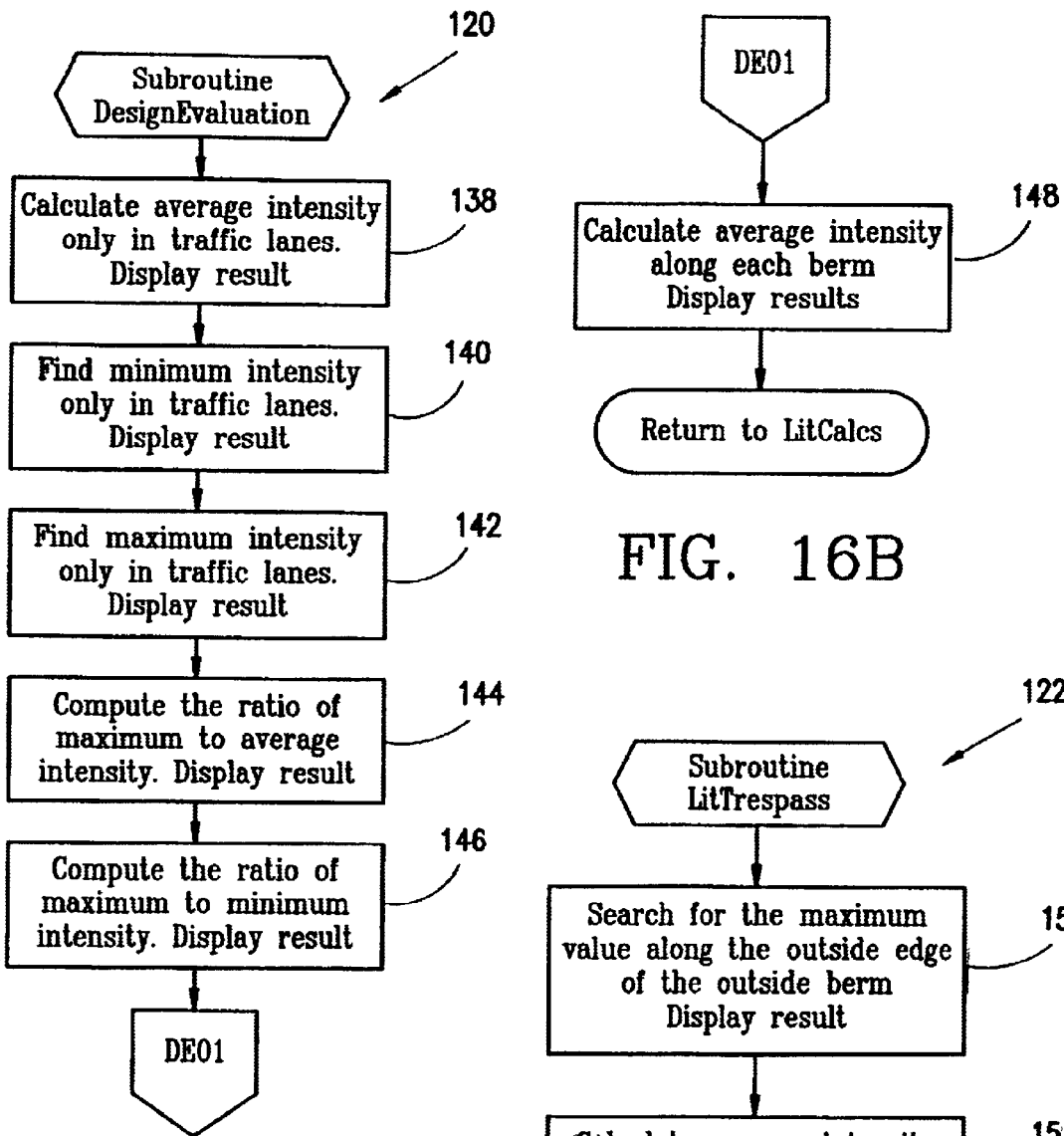
FIG. 16A
FIG. 16B
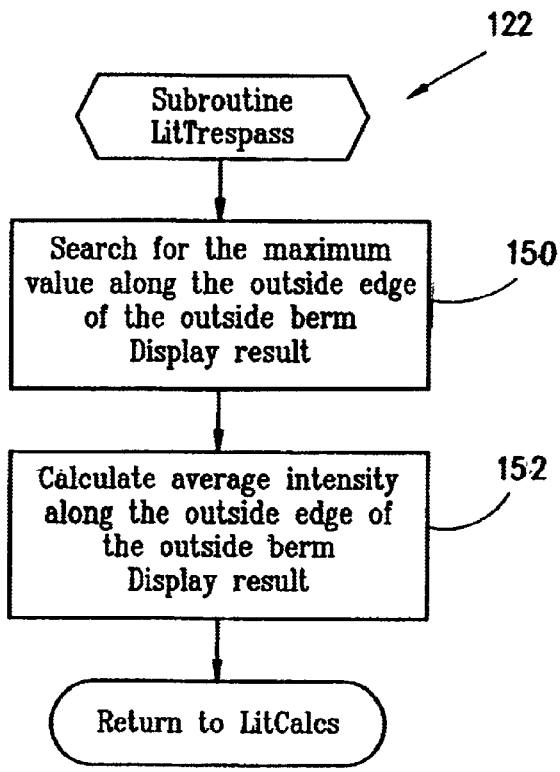
FIG. 17

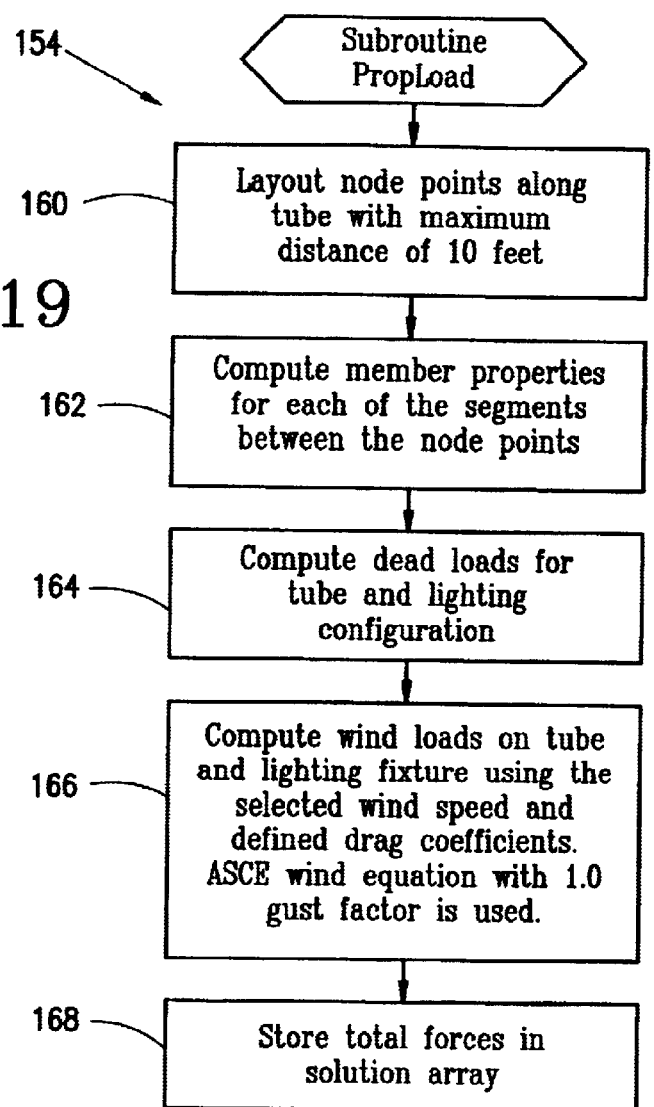
FIG. 19
FIG. 18
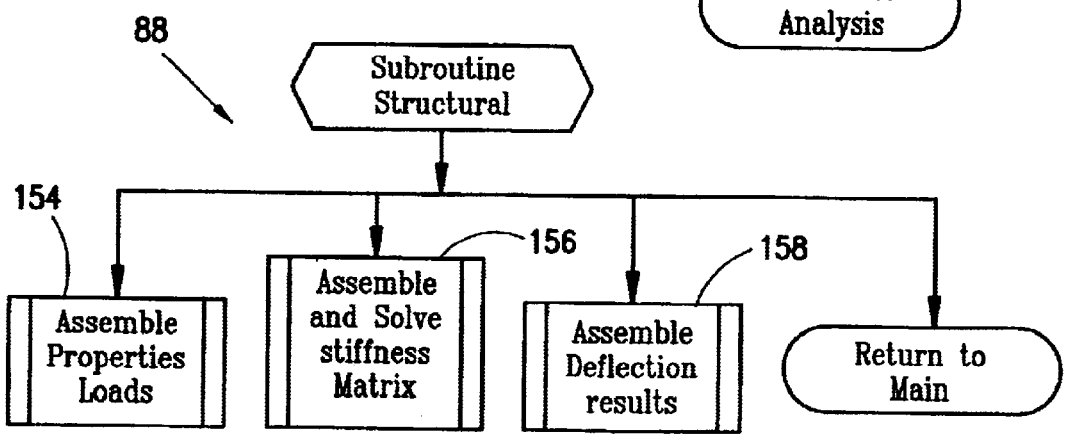

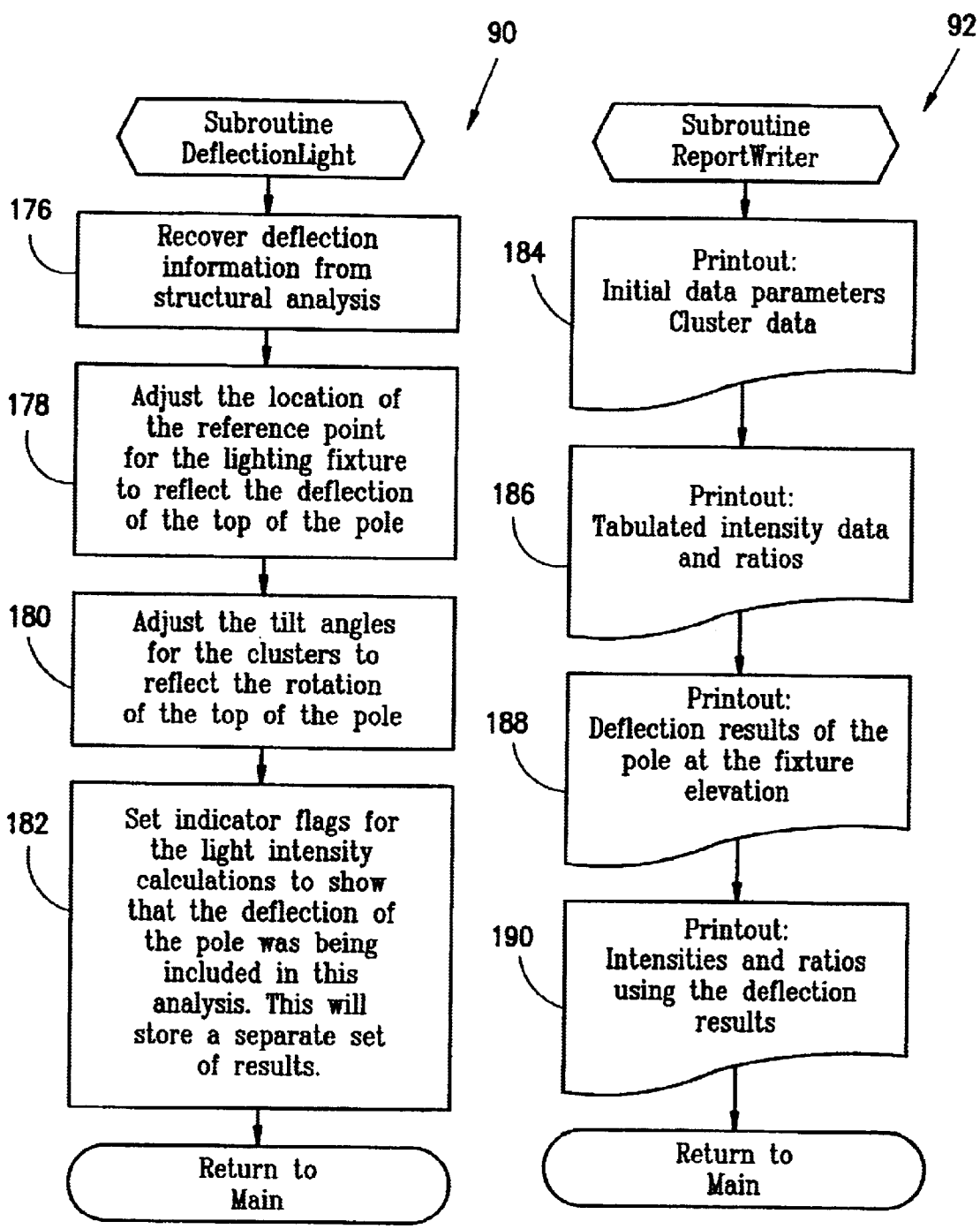

AREA LIGHTING DEVICE USING DISCRETE LIGHT SOURCES, SUCH AS LEDS

RELATED APPLICATION

This is a division application which claims the priority benefit of application Ser. No. 09/678,659, filed Oct. 4, 2000, which claims the priority benefit of provisional application Ser. No. 60/157,130, filed Oct. 4, 1999.

FIELD OF THE INVENTION

The present invention relates generally to area and/or volume radiation illumination such as area lighting and specifically to highway lighting and to a lighting device using discrete light sources, such as LEDs, and a method for calculating light and/or wavelength radiation intensity on a target surface and/or surfaces, and/or volume, and/or volumes illuminated by a plurality of light sources.

BACKGROUND OF THE INVENTION

The present state of LED technology is such that individual LEDs, while very efficient in conversion of electrical energy to light and/or other wavelength radiation generation, produce very small quantities of light. Accordingly, the typical LEDs currently available commercially have not been used for illumination of significant areas, such as highways or runways.

Based on research to illuminate a typical 400 foot section of interstate highway and meeting the existing design requirements of the governing AASHTO Engineering Design Code, the required number of individual LEDs is very large. The present invention is directed to the need for controlling and focusing this very large number of individual point-light sources, from on top of a typical 80 to 160 foot tall, high-mast lighting pole, unto the required section of highway, which may or may not be straight and usually is not a two-dimensional surface, and providing a relatively uniform light intensity across the full length and width of the highway section.

The main structural engineering design limitation of existing highway high-mast lighting poles is the wind load constraint, which is in part a function of the projected surface area of the lamps perched at the top of the pole. Retro-fitting existing poles requires that the replacement illumination equipment not exceed the existing lamp projected surface area. The typical high-mast pole lamp clusters has a projected surface area of 10 square feet. The present invention is directed to a need to provide a lighting device that allows the use of a large number of individual LEDs packaged in such a manner as to have a projected surface area less than that of the lamps being replaced.

Prior art systems for illuminating large, distant areas generally are deficient in that they produce light pollution, confusing night time driving conditions, light trespass, glare, energy waste, high maintenance cost and contribution to urban sky glow. The present invention is directed to a need to provide an area lighting and/or other wavelength radiation device that avoids the shortcomings of the prior art lighting systems. While the terms lighting or light are used herein, the reader will recognize that where appropriate the terms lighting or light could be substituted with any appropriate wavelength radiation.

OBJECTS AND SUMMARY OF THE INVENTION

It is an object of the present invention to provide an area lighting device that controls and focuses a very large number of LEDs from on top of a typical 80 to 160 foot tall, high-mast lighting pole, unto the required section of highway, and provides a relatively uniform light intensity across the full length and width of the highway section.

It is another object of the present invention to provide an area lighting device that can retro-fit existing poles without exceeding the existing lamp projected surface area thereby to stay within the design wind load of the exiting poles.

It is an object of the present invention to provide an area lighting device that provides a light output that minimizes the occurrence of light pollution, generation of confusing driving conditions due to confusing night time lighting patterns, light trespass, glare, energy waste, high maintenance cost and contribution to urban sky glow.

It is another object of the present invention to provide an area lighting and/or other wavelength radiation device that provides a more overall uniform lighting pattern and intensities on the targeted illumination area, surface or space.

It is another object of the present invention to provide an area lighting and/or other wavelength radiation device that provides precise placement of light and/or wavelength radiation intensity in the target area and/or volume.

It is still another object of the present invention to provide an area lighting device that uses relatively narrow angularity LEDS and/or lens covered EL panels that minimizes the total potential light available at any one angle of view thereby reducing the potential amount of light available to glare.

It is another object of the present invention to provide an area lighting device that uses different wavelength LEDs and/or EL panels and/or radiation sources having wavelength intensities different from standard car headlight wavelengths to provide the driver with clearly defined separation between the area lighting provided by the lighting device and the trail-blazing of the driver's car headlights, allowing the driver to better navigate through complex highway interchanges, ramps, and traffic pattern merging and crossing areas.

It is still another object of the present invention to provide an area lighting device that uses LEDs or ELs whose light output can be maintained at a constant level by use of feedback illumination measuring equipment configurations, thereby reducing the maintenance costs associated with bulb replacement.

It is another object of the present invention to provide an area lighting and/or other wavelength radiation methodology that allows the designer to provide illumination to the target area and restrict the illumination levels of individual light sources to provide the desired light intensity pattern desired within the target area.

It is still another object of the present invention to provide an area lighting and/or other wavelength radiation methodology that allows the designer to create more tightly contrasting light and dark intensities over a large well defined target area and/or volume.

The present invention provides an area lighting device, comprising a plurality of panels arranged into a hollow box having interconnected side walls and open bottom; and at least one of the wall panels comprising a light emitting panel having a lighted side facing inside the hollow box. An advantage to the light-box construction is that radiation sources, such as LED's, when mounted on a typical circuit-board, tend to radiate more heat on the circuit-board side as opposed to the illumination generation side. That is, in the case of LED's mounted on a typical circuit-board, a majority of the waste-heat generated originates not on the LED circuit side by rather on the "backside" of the circuit board. By building the light-box, with "backside" of the circuit-board panel on the outside of the box, waste-heat is more easily wicked away from both the circuit-board and the LEDs. This is important when using radiation sources such as LEDs because heat-build-up can cause both permanent and temporary light-output degradation and reduced-life-expectancy of the typical LED. The box construction allows free passage of air or other fluids through the box, allowing for waste-heat wicking from the radiation-source side of the circuit-board panels.

The present invention also provides an area lighting device, comprising a plurality of panels arranged into a hollow box having interconnected side walls, open bottom and an enclosing top wall; first, second and third of the side walls panels comprising of different radiation wavelength sources such as red, green and blue light emitting panels and/or different configurations or patterns of different radiation wavelength sources arranged on individual panels, respectively, each having an illuminating side facing inside the hollow box.

The present invention further provides an area lighting device, comprising a first plurality of panels arranged into a first hollow box having interconnected side walls and open top and bottom, at least one of the side wall panels comprising a light emitting panel having a lighted side facing inside the first hollow box; a second plurality of panels arranged into a second hollow box having interconnected side walls and open bottom, at least one of the side wall panels comprising a light emitting panel having a lighted side facing inside the second hollow box; and an enclosure connecting the bottom of the second box to the open top of the first box such that light generated within the second box is transmitted to the first box. The second box need not be physically attached to the first box. Radiation generated within the second box may be directed from the second box to the portal of the first box.

The present invention further provides a street lighting device, comprising a pole; a luminaire disposed at an upper end of the pole; and the luminaire including a plurality of light emitting panels oriented toward the street to provide area lighting.

The present invention also provides a method for calculating the illumination intensity on a target surface and/or volume provided by a plurality of light sources disposed in one location above the target surface, each light source providing a cone of light where the axis of the cone has the highest light intensity and the boundary of the cone represents a percentage (typically 50%) of the wavelength radiation intensity from the center, the method comprising of subdividing the target volume into individual target surfaces; subdividing the target surface into grids; for each grid, calculating the light intensity provided by each light source by taking the cross product of a location vector represented by a line connecting the light source and the grid, and an aiming vector represented by the cone axis; calculating the angle between the location vector and the aiming vector; if the angle is less than one-half the cone angle, calculating the primary lighting intensity at the grid; if the angle is greater than one-half the cone angle, but less than the secondary angle, calculating the secondary light intensity at the grid; plotting the total light intensity at each grid.

The present invention also provides a method for calculating the illumination intensity on a target surface and/or target volume provided by a plurality of radiation sources disposed in a first location removed from the target surface and/or target volume and the interaction of the first radiation intensity pattern with a radiation intensity pattern generated by a plurality of radiation sources disposed in a second location removed from the target surface and/or target volume.

The present invention also provides a method for calculating the illumination intensity on a target surface and/or target volume provided by a plurality of radiation sources disposed in a first location removed from the target surface and/or target volume and the interaction of the first radiation intensity pattern with a radiation intensity pattern generated by a plurality of radiation sources disposed in a second radiation sources' location target's surface and/or target's volume.

These and other objects of the present invention will become apparent from the following detailed description.

BRIEF DESCRIPTIONS OF THE DRAWINGS

FIG. 1 is a schematic perspective view of an LED cluster.

FIG. 2 is a schematic perspective view of a hollow box, one or more its walls being made up of the light emitting panels, such as the LED cluster of FIG. 1.

FIG. 3 is another embodiment of the hollow box of FIG. 2.

FIG. 4 is a cross-sectional view of two light boxes cascaded together via a connecting enclosure.

FIG. 5 is a block diagram of a feedback control for maintaining the light output of an LED cluster.

FIGS. 9A–23 are detail flowcharts for the overall flowchart of FIG. 8.

DETAILED DESCRIPTION OF THE INVENTION

Figure 6:
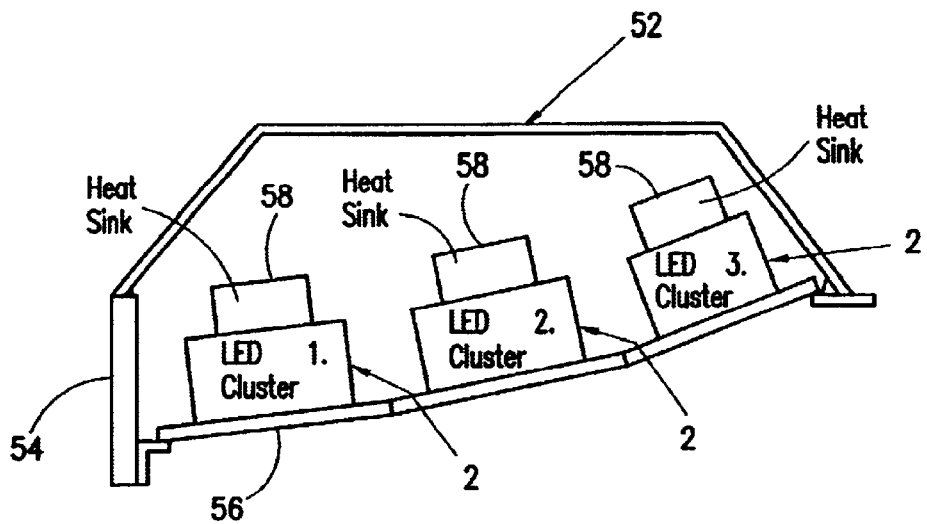
FIG. 6 is a cross-section view of a street light luminaire using the lighting device of the present invention.
Figure 7:
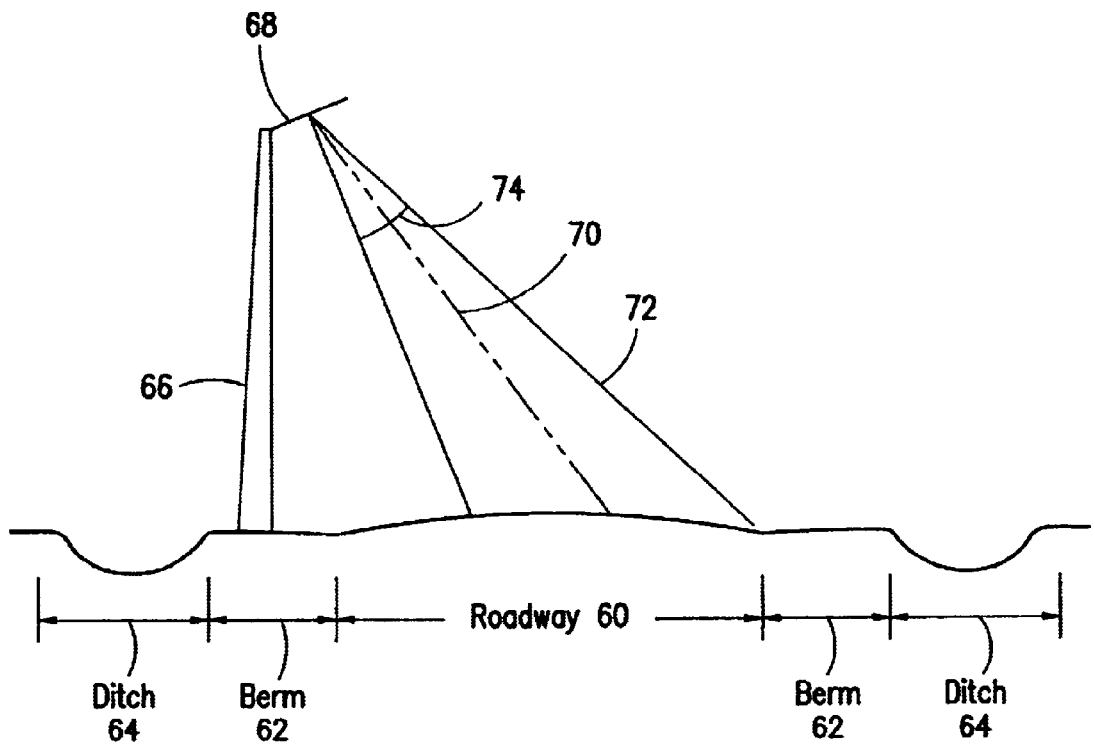
FIG. 7 is a side elevational view of a roadway illuminated by a pole mounted light source.

Referring to FIG. 1, an LED cluster 2 is disclosed, comprising a plurality of individual LEDs (light emitting diodes) 4 disposed along a number of rows and columns on a circuit board 6 that may include heat transfer surfaces, such as that disclosed in U.S. Pat. No. 5,857,767. The LEDs may be white or red or green or blue, a mixture of these wavelengths or other individual or mix of wavelengths, visible or otherwise. Typical LEDs exhibit angularities between 4°–30°, meaning that the light generated is mostly contained within a cone of angles ranging 4°–30°, with the vertex originating at the LED, the side of the axis of the cone representing maximum light intensity and the side of the cone representing 50% light intensity. The cone angle is also referred to as a primary angle.

An example of an EL (electroluminescent) panel is disclosed in U.S. Pat. No. 4,482,580.

To obtain more light than an LED cluster or an EL panel can provide and stay within the 10 ft$^2$ projected area dictated by existing pole design for wind load, a hollow light box 8 having interconnected side walls 10, a top wall 12 and open bottom 14 is formed, where one or more of the side walls or top wall 12 is comprised of the LED cluster 2 and/or EL panel, as best shown in FIG. 2. The lighted side of the LED cluster or EL panel faces into the interior of the light box and the light collected within exits through the bottom opening 14.

The light box 8 provides greater surface area for discrete light and/or other radiation sources without increasing a predetermined projected area, which is the area projected by the panel unto a plane perpendicular to the plane of the opening 14. Specific panels can be assigned to different wavelength-specific light emitting sources which can be independently controlled for light output. Individual panels may also provide for more than one type of light source and wavelength. For example, each of the three primary colors can be assigned on the inner surface of the light box 8. This allows the projection of one, two, three or more colors with preselected individual intensities to generate mixed light existing through the opening 14. As with a predetermined projected area, the light box 8 can address a predetermined volume requirement.

The light box 8 can be any shape, such as cubic, rectangular, etc. Preferably, the light box is a trapezoidal box 16 with two opposing rectangular walls 18, two opposing trapezoidal walls 20, a top wall 22 and an open bottom 24. The LED cluster 2 and/or EL panel and/or other radiation sources may make up any one of the side walls 18 and 22 or the top wall 22. Preferably, the inclined side walls 18 comprise of the LED cluster 2 or an EL panel. The inclination of the walls 18 presents a smaller vertical projected area and further improves the exit of the light generated through the opening 24.

To generate white light for area lighting, a combination of red, green and blue LED clusters may be used for the light box. However, red LEDs in combination with blue and green EL panels may be used to take advantage of their generally better light producing characteristics.

A plurality of the light boxes 16 may be cascaded to obtain greater light output, as best shown in FIG. 4. A light box 26 is interconnected to another light box 28 through an enclosure 30 such that light generated by the light box 26 is transmitted through the enclosure 30, into the other light box 28 and thence to the outside, as generally indicated by the arrows 32. Retro-reflective panels 34 may be disposed in front of light emitting panels 33, such as the LED cluster 2 or EL panels. Another retro-reflective panel 36 may be disposed across the bottom opening of the light box 26. Reflective panels or coatings 38 may be disposed within the interior surfaces of the enclosure 30 for light reflection. An opening 40 between the enclosure 30 and the light box 28 allows light to enter the light box 28. Similarly to the light box 26, retro-reflective panels 42 may be disposed in front of light emitting panels, such as the LED clusters 2 or the EL panels. Retro-reflective panels 44 may be disposed across the bottom opening of the light box 28. A retro-reflective panel (not shown) may be disposed across the opening 40.

A retro-reflective material returns light into the immediate neighborhood of its source, but allows light from the opposite direction to pass through. In effect, a retro-reflective material is a biased-in-one-direction transmissive material. U.S. Pat. No. 5,442,870, issued to Kochanowski, discloses a retro-reflective material.

The panel 36 or 44 may be a wavelength specific filter or may include features to direct the light in a specific direction.

The light box configuration advantageously concentrates the light generated by the numerous individual LEDs while minimizing the projected surface area of the device itself.

The use of racked or ganged light boxes advantageously allows for more efficient use of the volume of a given maximum projected surface area thereby to maximize the number of individual LEDs available for illumination purposes.

The light output of the LED cluster 2 or the EL panel may monitored with a sensor 46, whose output is fed to a controller 48 and is used to control a power source 50 connected to the LED cluster 2. The output of the power source is appropriately adjusted to maintain the light output of the LED cluster at the desired level.

The sensor 46 may be disposed so as to measure the overall area illumination and the specific highway section illumination. The sensor 46 may also measure the light output of individual light emitting sources within specific light emitting source groupings by sampling the actual light generated by predetermined individual light emitting sources. Selection is determined by the statistical requirements of the individual LED grouping in question and/or the required configuration, pattern and/or the relative importance of illumination maintenance.

Light output may also be measured at the light box interior, the boundary between two or more light boxes, exit conditions of light leaving a light box or the light composition striking at the target.

The sensor 46 may also measure the specific light intensity generated by each color LED clusters, since shifts in intensity will produce shifts in total wavelength configuration, changing the color of the total light output. Different color LED clusters experience different light output degradation that will cause color shifts over time. Furthermore, LEDs and EL light sources suffer from both a permanent decline of light output over time, for a given power input level and temporary increases and decreases in light output due to changes in local environment of ambient temperature, humidity, etc. In addition, minor shifts in quality of the power supply, such as slight drops in voltage, can also shift the light output and wavelength of these light sources.

With the disclosed feedback control, energy radiation, light intensities and appropriate combination of wavelengths provided by different color LEDs and/or EL panels and/or other radiation sources can be adjusted to maximize energy radiation or light penetration of the medium separating the light source and the target surface and/or target volume. For example, if the environment is foggy, dusty, misty, or if it is raining, snowing, etc., the best wavelengths to penetrate the atmosphere may be boosted and the wavelengths that are likely to be defracted or reflected can be cut back to increase visibility.

An existing street light luminaire 52 retrofitted with LED clusters 2 or EL panels, which may be configured as light boxes made in accordance with the present invention, is disclosed in FIG. 6. The luminaire 52 is attached to a pole (not shown) at attachment means 54. The existing bulb has been replaced with the LED clusters 2. Each LED cluster may be aimed at different directions toward the target surface to deliver the desired lighting intensity at the target surface. A clear panel 56 allows light to pass through. Each LED cluster 2 may include a heat sink 58 which may be attached using heat transmissive material to the housing of the luminaire 52 if the housing is made of heat transmissive material, such as aluminum. The number of LED clusters 2 is determined by the amount of light available from each cluster, the height of the luminaire 52, the area of the target to be illuminated, the amount of light desired on the target area, the contour of the target area and several other factors that will be discussed below.

Retro-fitting existing poles requires that the replacement illumination equipment not exceed the existing luminaire's projected surface area. If additional space is required than what is available within the volume of the luminaire, other interior space may be used, such as the base of a high-mast pole.

Since LEDs and EL panels are more efficient than existing lamps available today for street lighting, and since LED clusters and EL panels are more discriminately aimed toward the target area, thereby minimizing waste due to unwanted light trespass, the existing power supply available at the pole will have some freed up capacity that can be used to power other pole mounted systems, such as surveillance video, highway advisory radio, roadside weather monitoring equipment, wireless communication equipment, etc.

Figure 8:
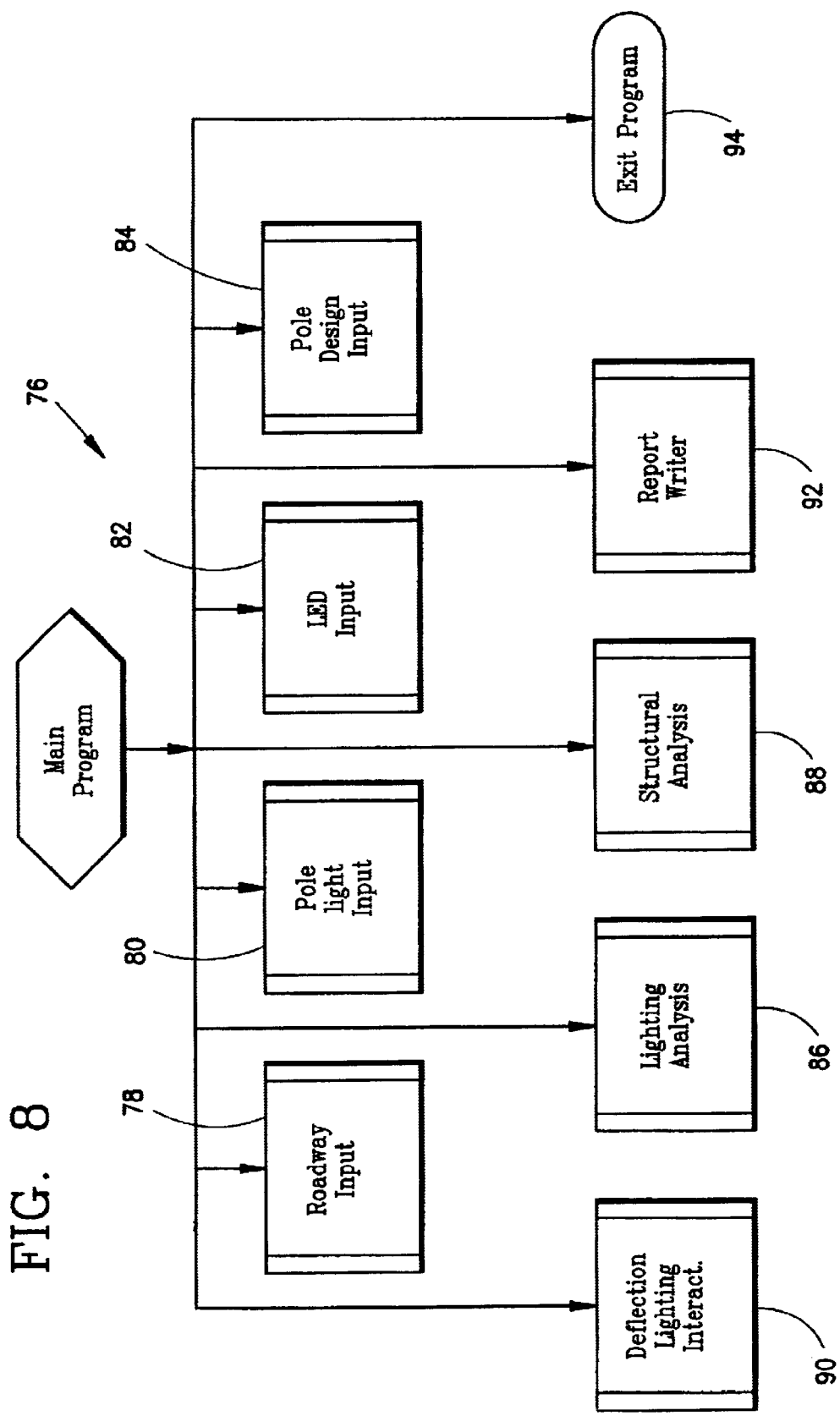
FIG. 8 is an overall flowchart of a program used in the present invention for calculating the light intensity on a target surface being illuminated by a plurality of light sources.

Referring to FIG. 8, a cross-section of a typical roadway is shown. The roadway includes a travel section 60, a berm or shoulder 62 on either side of the travel section and a drainage ditch 64 adjacent each berm. A high mast 66 supports at its upper end an LED cluster 68 directed to the roadway surface at an aiming direction which forms the axis 70 of a cone 72 with an angle 74, called primary angle. The vertex of the cone 72 is disposed at the cluster 68. The LEDS used in the present invention generates light within a narrow cone where the center of the cone has the highest light intensity and the boundaries represent 50% light intensity. Light outside the cone and within a larger cone with an angle called secondary angle may also be considered in determining the light intensity on the target surface.

The present roadway lighting design code requires that the roadway travel surface be at specific minimum illumination intensities, depending on the type of highway in question, i.e. interstate highway, secondary roadway, etc. The present roadway lighting design code also requires that certain nearby surfaces other than the traveling roadway surface be illuminated with specific illumination intensities, again depending on the highway in question. Some of the non-traveling surface, nearby surfaces usually required to be illuminated are the roadway shoulders and berm areas, and frequently the drainage ditch areas. The lighting design engineer may also desire to illuminate areas such as highway interchange in-fields for enhanced driving safety and other safety reasons. The design engineer may, therefore, be required to provide radiation and/or light patterns with significant intensity shifts from one specific area to another.

In the case of a single-point-source of light and/or radiation, where the angularity from the axis of the projected radiation and/or light is known, and the spatial relationship between the single-point-source and the planar surface to be illuminated is known, it can be said that there exists a cone of radiation and/or light formed from the single-point-source (being the cone's vertex) to the illuminated planar surface (being the cone's base). If the axis of the cone is perpendicular to the illuminated planar surface, then the projected radiation and/or light onto the planar surface will be in the form of a circle of illumination. The concentration or intensity of the illumination along the length of a given diameter of the circle of illumination is dependent on the distribution of radiation and/or light within the angularity of the given single-point-source. That is, given an XY coordinate orientation to the illuminated circle, the typical intensity, if measured as a function in Z axis across a given diameter, would be "bell-shaped".

In the case of two single-point-sources of light and/or radiation, where the angularity from the two axes of the projected radiation and/or light is known, and the spatial relationship between the individual single-point-source and the planar surface to be illuminated is known, and the axis of the first single-point-source is parallel with the second single-point-source, it can be said that there exists, in concept, two cones of radiation and/or light projecting to the illuminated planar surface (being the cone's base). If the two axes of cones are perpendicular to the illuminated planar surface, and the distance between the cone axes is less than the diameter of the cones at a given distance from the cones' individual vertexes then the projected radiation and/or light onto the planar surface will be in the form of an ellipse, and the typical intensity, if measured as a function in the Z axis across the major-axis of the ellipse (in the XY plane), would still be "bell-shaped".

Assume that orientation of the single-point-source of radiation and/or light vis-a-vis the cone's base (the planar surface to be illuminated) is changed so that the axis of the cone is less than 90° to the planar surface to be illuminated. An example of this would be moving a streetlight from directly above the roadway to a position on the side of the roadway. (Note that the prior art in roadway lighting usually does not allow the illuminating cone's axis to be tilted off the perpendicular to the plane of the highway surface.) The resulting projected area of illumination is "ellipse-like", but the minor-axis closest to the single-point-source, in the plane of the illuminated surface, is smaller than the "ellipse-like" shape' minor-axis which is father away from the single-point-source. Given an XY coordinate orientation to the illuminated "ellipse-like" shape, the typical intensity, if measured as a function along the Z-axis across the major-axis of the ellipse (in the XY plane), would be "bell-shaped" but shifted toward the foci closest to the single-point-source. The typical intensity, in the Z-axis across the two XY plane minor-axis would be "bell-shaped" with the overall intensity higher for the minor-axis closest to the single-point-source. (In the special case of the streetlight, the "ellipse-like" projected illuminated area major-axis, in the XY plane, would be perpendicular to the length of the road surface in question). Tilting the conical axis of the two single-point-sources where the radiation and/or light form one point-source acts in concert with the radiation and/or light from another single-point-source, on a single reference point on the XY plane of the surface to be illuminated, resulting in an additive nature to the total illumination intensity at that given XY plane reference point.

Assume that the orientation of the single-point-source of radiation and/or light vis-a-vis the cone's base (the planar surface to be illuminated) is changed so that the axis of the cone is less than 90° to the planar surface to be illuminated and also moved relative to the XY plane of the surface to be illuminated. An example of this would be moving a streetlight from directly above the roadway to a position on the side of the roadway and then moved down the road parallel to the roadway with the chosen area for illumination remaining stationary. In this configuration the "ellipse-like" illuminated area's XY plane major-axis is no longer 90° to the direction of the roadway. As in the two-cone case, tilting the conical axis of two single-point-sources, both away from and down-the-roadway, where the radiation and/or light from one point-source acts in concert with the radiation and/or light from another single-point-source, on a single reference point on the XY plane of the surface to be illuminated, resulting in additive nature to the total illumination intensity at that given XY plane reference point.

The above conditions assume that the surface to be illuminated is flat or exists in only two dimensions. That is, for the above, within the physical limits of the desired surface to be illuminated, the relationship between a single-point-source illuminating cone axis and the cone base is constant across the entire illuminated surface.

Holding the axis of the cone at 90° to the planar surface to be illuminated, the illuminated surface is now not constrained to remain a two-dimensional XY planar surface. A simple example would be a fold along any diameter of the cone's circular base. The folded surface of the cone's base will elongate the illuminated circle diameter which is perpendicular to the fold, resulting in a "stretching" of the "bell-shape" of illuminating intensity, along the diameter perpendicular to the fold, across the illuminated surface. A specific example of this would be that of roadway high-mast lighting, where the road surface is crowned or sloped such that the elevation of the cross-section changes from one side of the roadway to the other side. Roadways usually have drainage ditches on either side of the traveling surface, and there is usually a shoulder or berm between the drainage ditches and the traveling surface, and the traveling surface itself is usually tilted or slanted to accommodate rain-run-off and/or banking to accommodate high-speed traffic on a curve in the roadway's direction. The present invention addresses and accounts for a roadway's non-planar aspects for illuminating purposes. In the general application of the present invention in illuminating with radiation and/or light a volume and/or a surface and volume combination, the design engineer can address non-uniform light/radiation-transmissivity of a given volume with or without the influence of surfaces encountered.

The orientation of the single-point-source of radiation and/or light vis-a-vis the cone's base (the planar surface to be illuminated), the assumption has been that the physical relationship between the single-points of illumination and the surface (and/or volume) to be illuminated was unchanging over time. The present invention provides the design engineer the ability to analyze and design for changes in spatial orientation between the illuminating sources and the intended surface(s) and/or volume(s) to be illuminated. A specific example, in the case of roadway high-mast lighting, is introducing wind blowing on the high-mast pole and the equipment located on the pole. Wind pushing on the pole and exposed equipment will tilt the orientation of the illuminating cone or cones away from the intended roadway surface areas. The present invention addresses any change in orientation of the illuminating apparatus, due to forces such as wind, or change or changes in the nature of surface(s) and/or volume(s) to be illuminated such as changes in shape, reflectivity, retro-reflectivity, radiation and/or light transmissibility or change in illuminating output due to changes in quality or quantity of power supply energy or changes in local environmental conditions affecting either illuminating intensities, transmission of illuminating energy to the illumination target(s) surface(s) and/or volume(s). Using a specific example of a high-mast roadway lighting, of wind on a support pole, resulting in a change in orientation and thus shift in the pattern of illuminating intensities and patterns on the desired targeted areas, the design engineer can analyze the illuminating pattern(s) and localized illumination intensities before and after application of the wind loading at various magnitudes. The resulting change in orientation, in the case on wind load on high-mast lighting can be analyzed for aspects such as light-trespass issues or "glare" considerations. Design of the physical support structures, and logistical systems support equipment are then considered to account for anticipated exo-system influences, such as, wind.

There are two responses to exo-system influences affecting orientation, in cases of physical loadings, and/or localized environmental aspects affecting radiation and/or light output quality or quantity, such as heat, degradation, power supply, and/or changes to the targeted surface(s) and/or volume(s) such as phase-shifts of material(s)' states (gas to liquid, liquid to solid), shifting reflectivity, and/or transmissibility.

The first response case assumes a passive design approach whereby the design engineer anticipates and provides for the exo-system influences. A specific example would be where the design engineer arrives at desired illumination pattern(s) and intensity(ies), analyzes the pattern(s) and intensity(ies) after application of anticipated exo-system influences such as wind, and changes the physical support structure, such as the diameter or strength of the tube sections of the support pole. Another possible design response to wind loads might be to selectively brighten and dim specific single-point-sources to address issues such as light-trespass from high-mast poles when high-wind loadings occur and with feedback-loop to the individual radiation sources, shift illumination patterns and intensities to compensate for the new orientation vis-a-vis the illumination target.

The second response case assumes an active feedback of information about the conditions at the illuminated surface (s) and/or volume(s) with the system-response adjusting either the physical orientation of point-sources vis-a-vis the target surface(s) and/or volume(s) and/or system-response adjusting the intensity(ies) of one or more point-sources and/or wavelengths of radiation and/or light.

A lighting design program 76, using the considerations discussed above, for providing the desired illumination intensity on a target surface using LED clusters or EL panels configured into light boxes is disclosed in FIG. 8. The program is set up to be highly interactive. The control of the program is menu driven so that the designer can select the various options to develop the design. The program is designed for high-mast roadway lighting and uses terms and language specific to the design and application of highway lighting. The program will be discussed using a single cluster of LEDS arranged in rows and columns and directed toward the surface to be illuminated. However, the program is also applicable where the "LED cluster" is a single LED, an EL panel, or a light box.

The program 76 comprises data input modules, namely, roadway input 78, pole light input 80, LED input 82 and pole design input 84; analysis modules, namely, lighting analysis 86, structural analysis 88 and deflection interact 90, and a report writer 92. The user is allowed to exit the program at 94 without losing data.

Figures 9A, 9B:
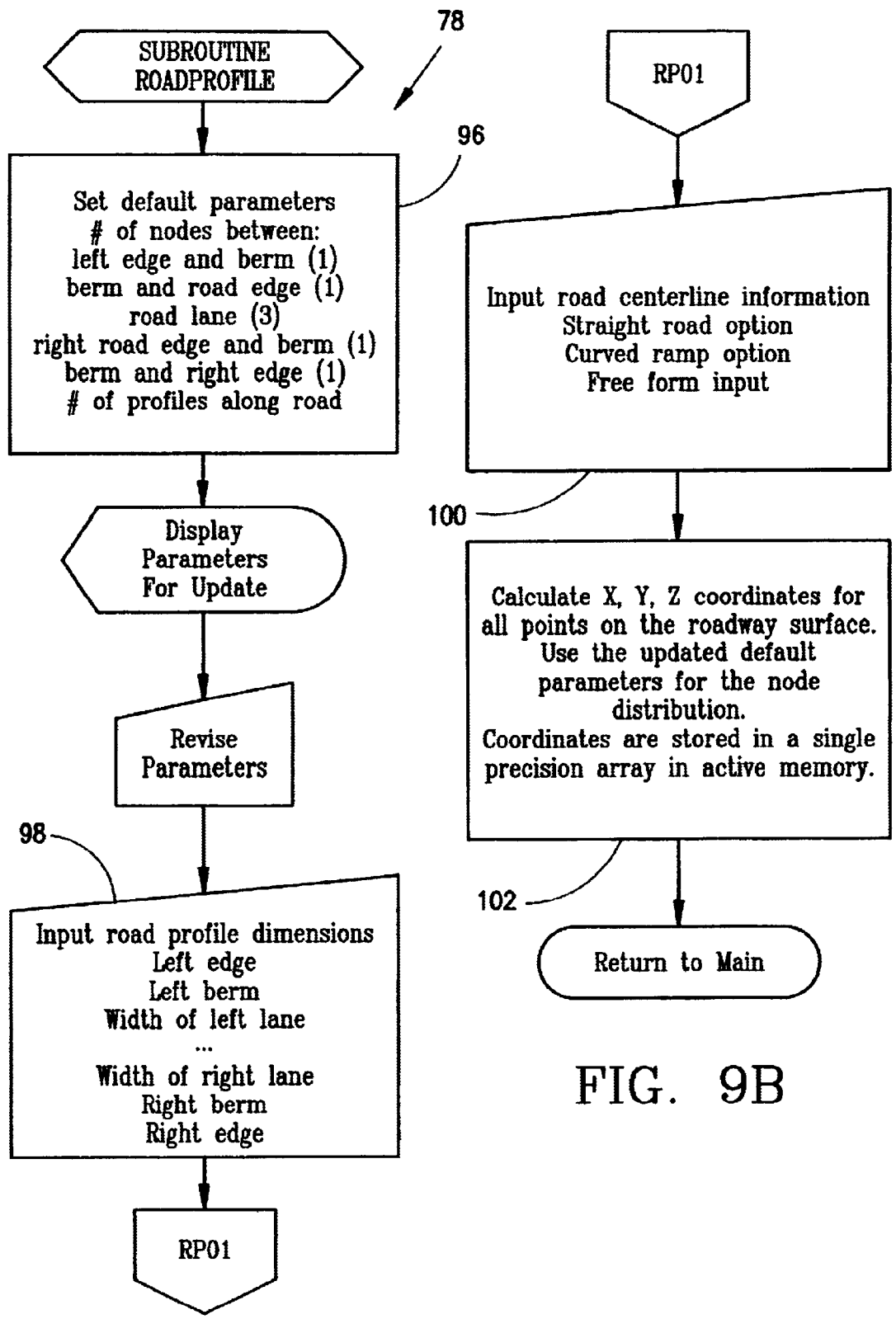

Referring to FIGS. 9A and 9B, the roadway input module 78 is implemented by ROADPROFILE subroutine. Default parameters on the number of nodes and the number of profiles are set at 96. The parameters are updated at 98 by inputting actual road profile dimensions. The road centerline information is input at 100. XYZ coordinates for each point on roadway is calculated at 102. As can be seen, the subroutine divides the roadway, including the berm and ditch areas, into grids, preferably one square foot each, or other suitable size dictated by the resolution desired. Each grid is then assigned an XYZ coordinate.

Referring to FIG. 10, the pole light input module 80 is implemented by POLELITE subroutine. The LED cluster 68 is characterized in terms of its elevation, amount of offset from the pole, and amount of tilt at 103. The data establish the position of the cluster in terms of its XYZ coordinates and the planar inclination of the cluster circuit board.

Referring to FIG. 11, the amount of light generated by the cluster 68 is input into the program by the LED INPUT subroutine. If there are more than one cluster, the group is characterized whether it is arranged as straight or curved at 104. If the group of clusters is straight, the number of rows, the number of clusters per row and inclination angle away from the pole for each row are input at 106. If the group of clusters is curved, the number of rings and the number of clusters per ring are input at 108. Data for each cluster is input at 110, including row number, cluster number, XYZ coordinate relative to the top of the pole, number of LEDs in each cluster, angle of inclination of the cluster, primary and secondary angles of individual LED in the cluster, standardized and secondary light output of individual LED. The LED subroutine locates each light source in space in relation to the roadway.

Figure 12:
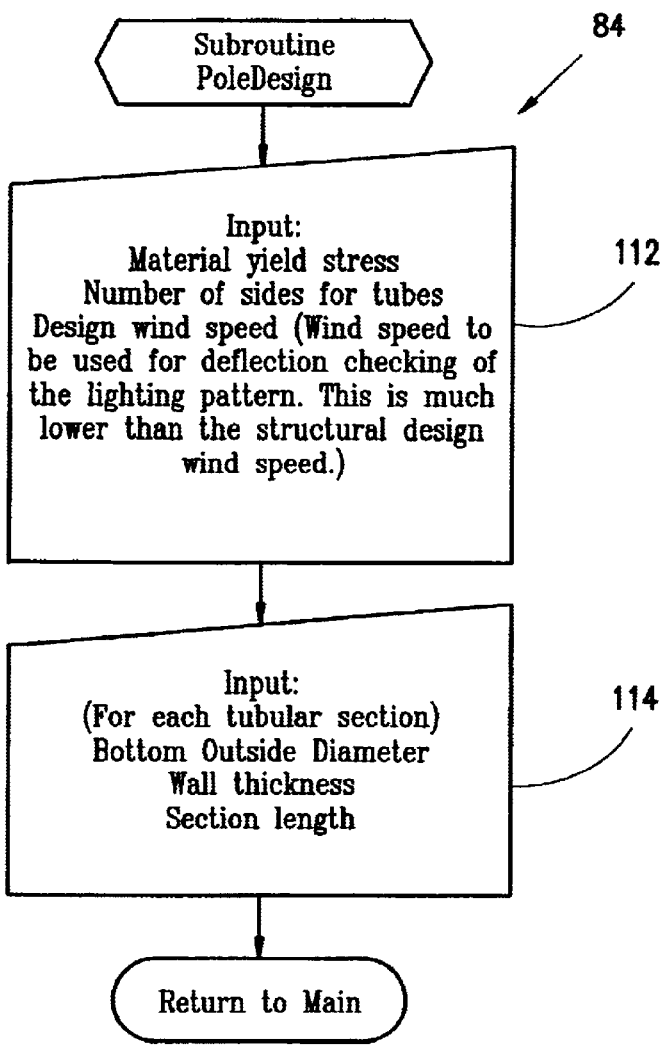
Figure 13:
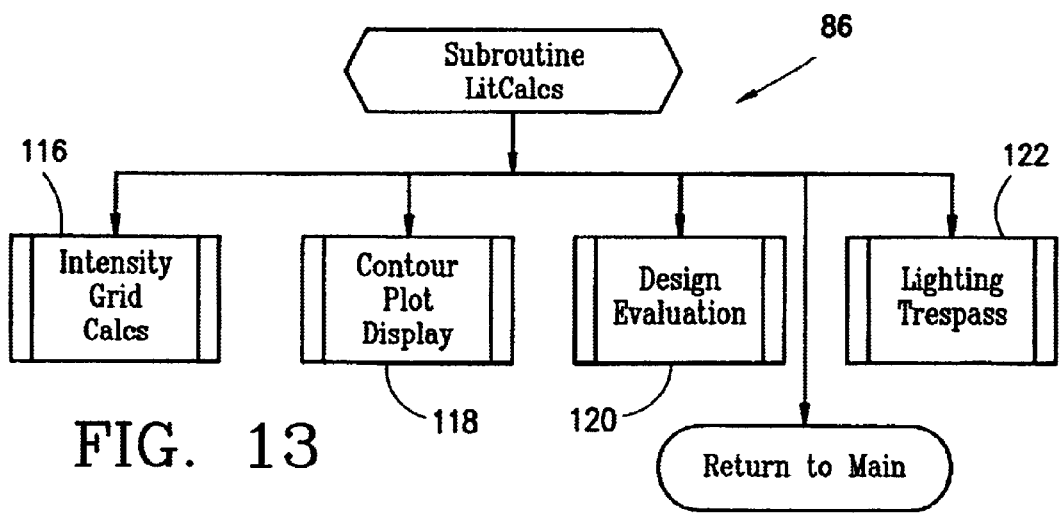

Referring to FIG. 12, the characteristics of the pole is entered at 112 and 114.

The lighting analysis module is implemented by LIT-CALCS subroutine, which is further implemented by intensity grid calculation module 116, which calculates the lighting intensity at each grid of the target surface; contour plot display module 118, which displays in graphical format the calculated lighting intensity across the illuminated surface; design evaluation module 120, which evaluates the calculated lighting intensity for compliance with code requirements; and lighting trespass module 122, which calculates the light intensity falling outside the target surface.

Figure 14A:
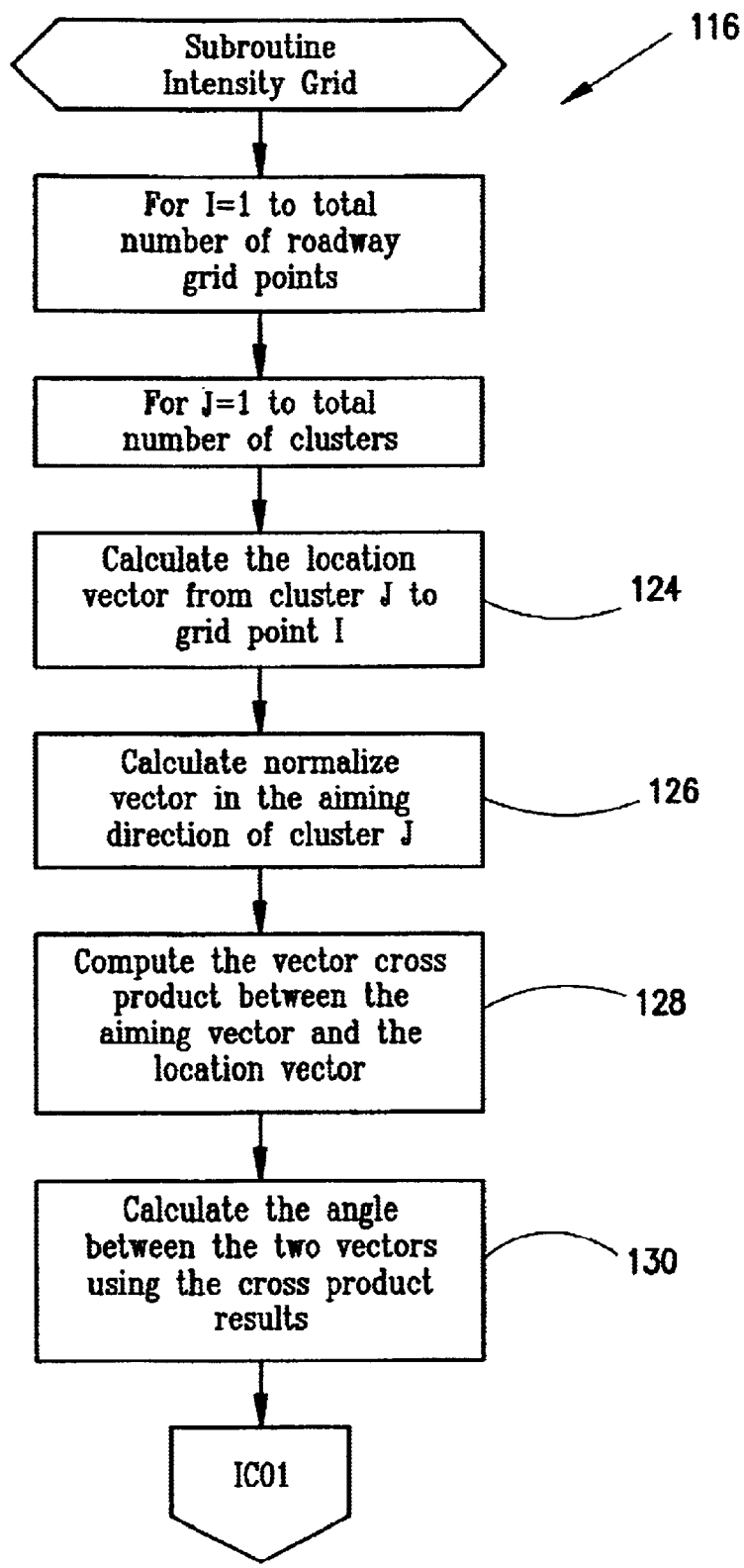

Referring to FIG. 14A, the light intensity at each grid attributable to the cluster 68 is calculated. A location vector from the cluster to the grid is calculated at 124. The location vector magnitude is equal to the distance between the cluster and the grid. The orientation is provided by the spatial disposition of the line connecting the cluster to the grid. An aiming vector for the cluster is calculated at 126. The direction of the aiming vector is along the same orientation as the cone axis 70 of the cluster. The vector product between the location vector and the aiming vector of the cluster is calculated at 128. The angle between the two vectors is calculated from the cross product at 130. A normalized vector is by definition "of unit length". The cross product is used to get the angle between two vectors. The individual angles for each of the vectors in Cartesian three-dimensional space is known, but the absolute value of the angle between the two vectors in a plane defined by the two vectors is unknown. The cross product calculation provide the unknown angle. Knowing the angle, the light intensity at that point form the given radiation source such as a given cluster of LEDs can then be determined. The light intensity may vary in different patterns depending on the type of radiation source used such as an LED. A "heavyside function" and a "bell-shaped-curve" are two of the most likely patterns to be used. These patterns would be symmetric about the aiming vector.

Figure 14B:
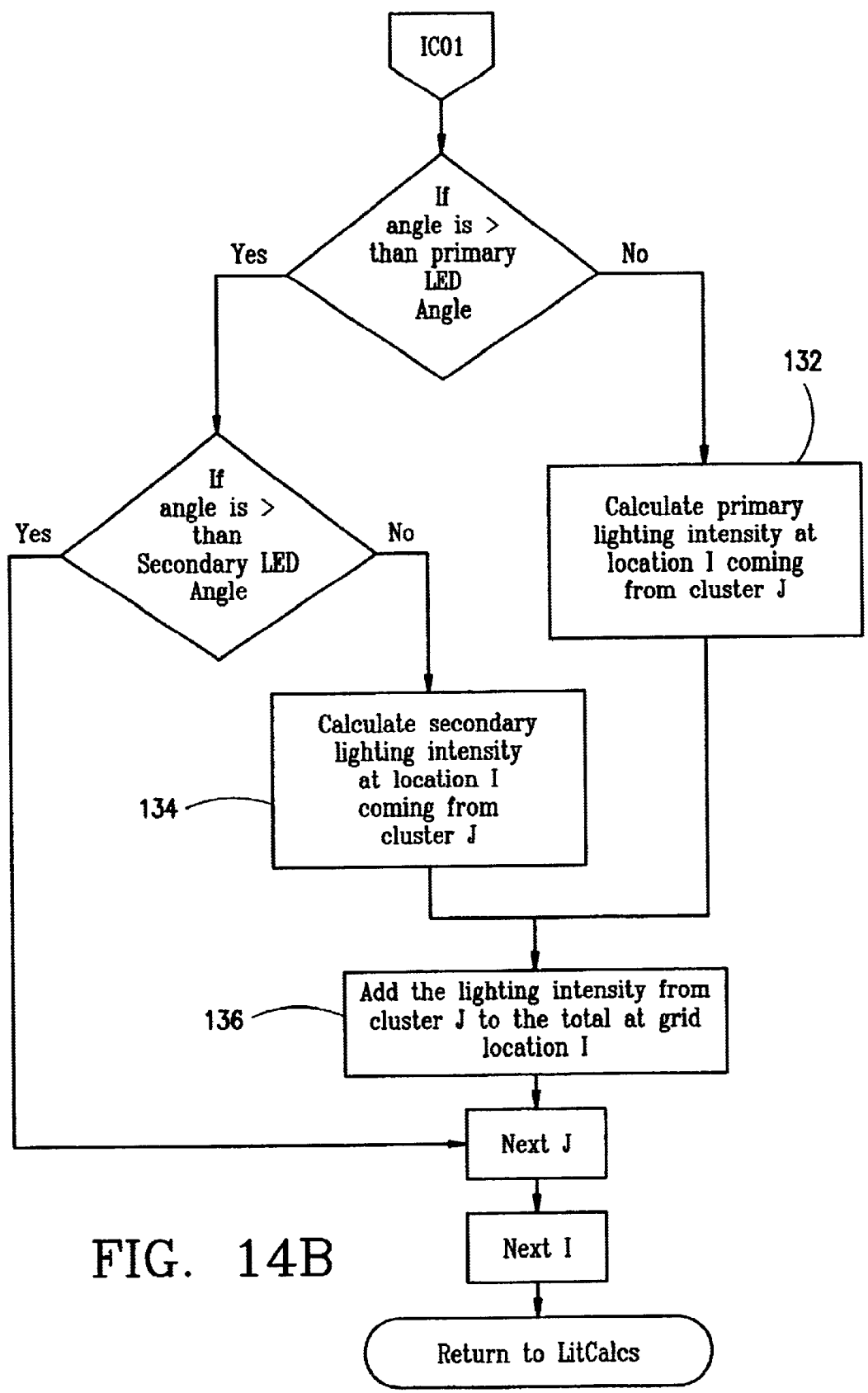

Referring to FIG. 14B, if the angle between the two vectors is less than the primary angle of the LED, then the primary lighting intensity at the grid in question is calculated at 132. If the angle is greater than the primary LED angle and less than the secondary LED angle, then the secondary lighting intensity at the grid in question is calculated at 134. The lighting intensity at the grid coming from all the LED clusters is calculated 136. The lighting intensity for all the grids on the target surface is calculated in this manner. The contribution of light provided by the secondary angle may be disregarded, if desired, to arrive at a more conservative result. However, when the secondary light is considered, the total energy requirement to meet the AASTHO minimums would be reduced.

Figures 15A, 15B:
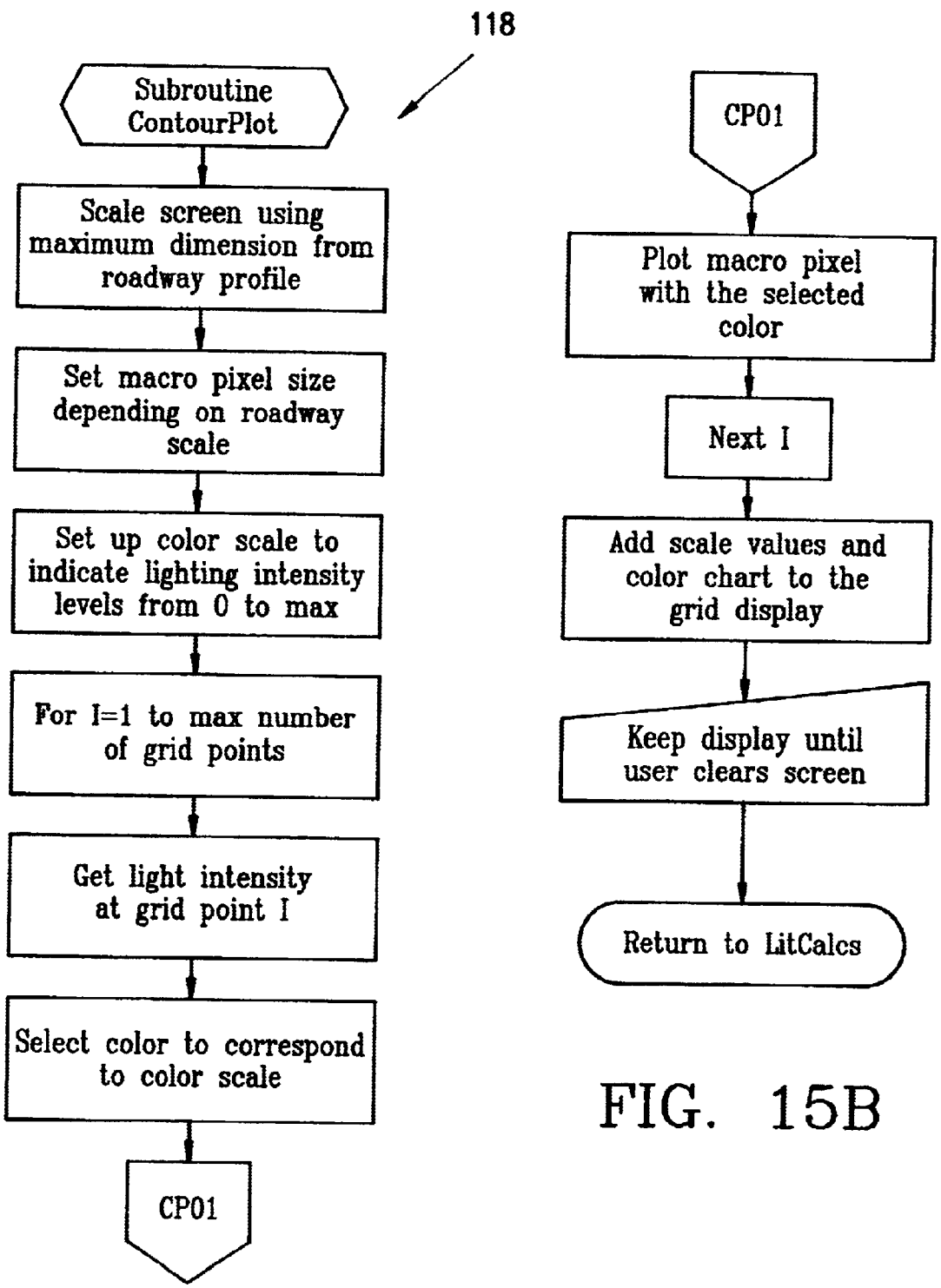

Referring to FIGS. 15A and 15B, the intensity calculation results for each grid is plotted on a screen using a color scale, which corresponds to the lighting intensity levels from zero to maximum. Each grid is then assigned a color depending on the intensity level at that grid.

Referring to FIGS. 16A and 16B, the design evaluation subroutine evaluates the calculated lighting intensity across the target surface being illuminated. The average lighting intensity in the traffic lanes is calculated at 138. The minimum and maximum lighting intensities in the traffic lanes are retrieved at 140 and 142, respectively. The maximum to average intensity ratio and the maximum to minimum intensity ratio are calculated at 144 and 146, respectively. The average intensity along each berm is calculated at 148. These ratios are then compared to code requirements.

Referring to FIG. 17, the maximum lighting intensity along the outside edge of the outside berm is determined at 150. The average intensity along the outside edge of the outside berm is calculated at 152. These values are reviewed to determine whether there is light trespass.

Referring to FIG. 18, the structural analysis module is implemented by properties load subroutine 154, which computes the loads on the pole; assemble and solve stiffness matrix subroutine 156, which provides the amount of deflection of the pole; and assemble deflection results subroutine 158, which saves the deflections and rotations at the point where the LED cluster is attached.

Referring to FIG. 19, the pole is divided into segments and the property of each segment is computed at 160 and 162. The dead loads for the pole, the load imposed by the lighting fixtures and the wind loads are computed at 164 and 166. The total forces in solution array is stored at 168.

Figures 20A, 20B, 21:
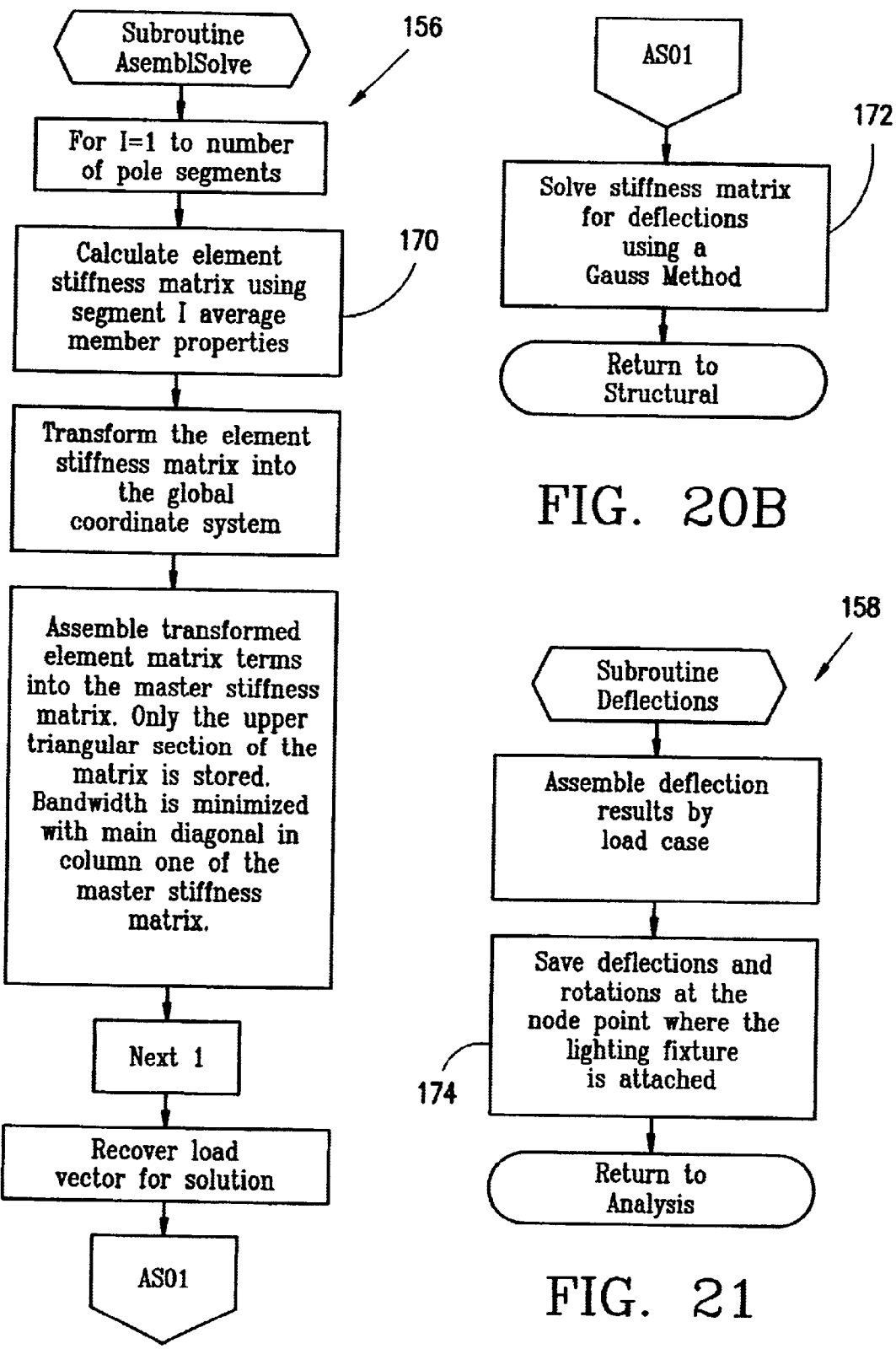

Referring to FIGS. 20A and 20B, the stiffness matrix is then calculated using the pole segment average member properties at 170. The stiffness matrix for deflections is then solved using a Gauss Method at 172.

Referring to FIG. 21, the amount of deflections and rotations at the node point where the LED cluster is located is saved at 174 for later use by the subroutine 90 to calculate the change in lighting pattern due to the deflection of pole.

Referring to FIG. 22, the deflection lighting subroutine 90 recovers the deflection information from the structural analysis subroutine, adjusts the location of the reference point for the LED cluster to account for the deflection of the top of the pole, and adjusts the tilt angles for the clusters to reflect the rotation of the top of the pole at 176, 178 and 180, respectively. The intensity grid subroutine 116 is then run at 182 to calculate the lighting intensity at each grid due to the new location and orientation of the LED cluster caused by the pole deflection.

Referring to FIG. 23, the report writer subroutine 94 generates printouts for the initial data parameters and cluster data at 184, tabulated intensity data and ratios at 186, deflection results of the pole at the LED cluster elevation at 188, and intensities and ratios using the deflection results at 190.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A method for calculating the illumination intensity on a target surface provided by a plurality of light sources disposed in one location above the target surface, each light source providing a cone of light where the axis of the cone has the highest light intensity and the boundary of the cone represents a lesser percentage of the wavelength radiation intensity from the center, comprising:

a) subdividing the target surface into grids;
   b) for each grid, calculating the light intensity provided by each light source by taking the cross product of a location vector represented by a line connecting the light source and the grid, and an aiming vector represented by the cone axis;
   c) calculating the angle between the location vector and the aiming vector;
   d) if the angle is less than one-half the cone angle, calculating the primary lighting intensity at the grid;
   e) plotting the total light intensity at each grid.

2. A method as in claim 1, and further comprising:

a) if the angle is greater than one-half the cone angle, but less than the secondary angle, calculating the secondary light intensity at the grid.

3. A method as in claim 2, and further comprising:

a) disposing the light sources at an upper end of a pole;
   b) calculating the amount of deflection of the pole at the location of the light sources due to wind;
   c) repositioning the light sources by the amount of the deflection;
   d) performing steps a)–e) to recalculate the light intensity at each grid from the light sources at the new position.

* * * * *